United States Patent
Lahnala (10) Patent No.: US 7,934,342 B2
(45) Date of Patent: May 3, 2011

(54) SLIDING WINDOW ASSEMBLY

(75) Inventor: David W. Lahnala, Adrian, MI (US)

(73) Assignee: AGC Automotive Americas, Co., Hebron, KY (US)

( * ) Notice: Subject to any disclaimer, the term of this patent is extended or adjusted under 35 U.S.C. 154(b) by 766 days.

(21) Appl. No.: 11/683,669

(22) Filed: Mar. 8, 2007

(65) Prior Publication Data
US 2008/0216410 A1   Sep. 11, 2008

(51) Int. Cl.
*E06B 1/00*   (2006.01)
(52) U.S. Cl. .............................. 49/380; 49/413; 49/483.1
(58) Field of Classification Search ............... 49/380, 49/413, 128, 129, 130, 209, 484.1, 490.1, 49/483.1
See application file for complete search history.

(56) References Cited

U.S. PATENT DOCUMENTS

| | | | | |
|---|---|---|---|---|
| 4,731,951 A | * | 3/1988 | Ikuta et al. ................... | 49/374 |
| 5,331,767 A | | 7/1994 | Takeuchi et al. | |
| 5,473,840 A | * | 12/1995 | Gillen et al. ................. | 49/380 |
| 5,542,214 A | * | 8/1996 | Buening ....................... | 49/380 |
| 5,724,771 A | | 3/1998 | Gipson | |
| 5,799,449 A | | 9/1998 | Lyons et al. | |
| 5,996,284 A | * | 12/1999 | Freimark et al. ............. | 49/209 |
| 6,014,840 A | * | 1/2000 | Ray et al. ..................... | 49/413 |
| 6,103,168 A | | 8/2000 | Kelly | |
| 6,216,392 B1 | | 4/2001 | DiGinosa | |
| 6,393,766 B2 | | 5/2002 | Nozaki et al. | |
| 6,572,176 B2 | * | 6/2003 | Davis et al. ............. | 296/146.16 |
| 6,740,390 B2 | | 5/2004 | Randazzo | |
| 7,025,405 B2 | * | 4/2006 | Gillen ..................... | 296/146.16 |
| 7,155,862 B2 | * | 1/2007 | Bourque et al. .............. | 49/413 |
| 2002/0148163 A1 | | 10/2002 | Warner et al. | |
| 2004/0144034 A1 | * | 7/2004 | Bourque et al. .............. | 49/413 |
| 2005/0044797 A1 | | 3/2005 | Daniel et al. | |
| 2005/0044798 A1 | | 3/2005 | Daniel et al. | |

* cited by examiner

*Primary Examiner* — Katherine Mitchell
*Assistant Examiner* — Catherine A Kelly
(74) *Attorney, Agent, or Firm* — Howard & Howard Attorneys PLLC (57) ABSTRACT

A sliding window assembly for a vehicle includes first and second fixed panels and upper and lower fixed panels with an opening defined between the fixed panels. At least one track member is attached to at least one of the fixed panels. A sliding unit is slidably engagable with the track member and slidable between an open position and a closed position. The sliding unit includes a carrier component having an outer face and a flange portion extending from the outer face. A sliding panel is attached to the flange portion. The sliding panel and the fixed panels form a substantially flush outer surface. A U-shaped seal is disposed on the fixed panels adjacent to and encircling the opening. The seal engages the outer face of the carrier component when the sliding unit is in the closed position.

19 Claims, 7 Drawing Sheets

SLIDING WINDOW ASSEMBLY

BACKGROUND OF THE INVENTION

1. Field of the Invention

The subject invention relates to a sliding window assembly, particularly for a vehicle, such as a pickup truck.

2. Description of the Related Art

Various sliding window assemblies for vehicles are known in the prior art. Examples of such assemblies are disclosed in U.S. Pat. No. 5,542,214 (the '214 patent) to Buening and United States Patent Application Publication No. 2005/0044798 (the '798 publication) to Daniel et al.

The sliding window assembly disclosed in the '214 patent includes a frame including a track member. The frame supports a pair of fixed panels defining an opening and the track member slidably supports a sliding pane, which is slidable between an open position and a closed position. In a first embodiment, the sliding unit supports the sliding pane and is slidable along the track member with a pair of sealing flanges extending along the vertical edges of the sliding unit. An O-seal is disposed on each of the fixed panels adjacent the opening such that each sealing flanges sealingly engages one of the O-seals when the sliding unit is in the closed position. Blade seals attached to the frame provide sealing directly against the sliding pane. In a second embodiment, a full-circumference flange extends around the sliding pane. A blade seal is attached to the flange around the circumference of the sliding pane. The blade seal sealingly engages the fixed panels or other surfaces when the sliding pane is in the closed position.

The sliding window assembly of the '798 publication includes a first fixed panel and a second fixed panel spaced apart from each other. An upper fixed panel and a lower fixed panel are spaced apart from each other and disposed between the first and second fixed panels. The fixed panels define an opening therebetween. A sliding unit is slidable along a track member between an open position and a closed position. The sliding unit includes a sliding pane with a sealing flange extending around the circumference of the sliding pane. A bulb seal is attached to the sealing flange around the circumference of the sliding pane. The bulb seal sealing fills the gaps between the sliding pane and the fixed panels when the sliding pane is in the closed position.

The prior art, as evidenced by the specific disclosure of the '214 patent and the '798 publication, provides several sealing solutions for sliding window assemblies. However, there remains an opportunity to provide a new technique for sealing a sliding window assembly. Specifically, there remains an opportunity seal for a sliding window assembly which provides an aesthetically pleasing appearance and resists damage and degradation.

SUMMARY OF THE INVENTION AND ADVANTAGES

The subject invention provides a sliding window assembly for a vehicle. The sliding window assembly includes a structural body defining an opening. The sliding window assembly includes at least one track member. A sliding unit is slidably engagable with the track member and slidable between an open position and a closed position. The sliding unit closes the opening when the sliding unit is in the closed position. The sliding unit includes a carrier component having an outer face and a flange portion extending from the outer face. The sliding unit further includes a sliding panel attached to the flange portion. The sliding window assembly also includes at least one seal. The seal is disposed on the structural body adjacent to and encircling the opening and is sealingly engagable with the outer face of the carrier component when the sliding unit is in the closed position.

Placement of the seal on the structural body provides several advantages. First, the seal is not directly exposed to the elements, e.g., precipitation, sunlight, road salt, etc. Therefore, the seal will have a greater life span, when compared to prior art window assemblies that expose the seal directly to the elements by compressing the seal between two panes of glass. Thus, the vehicle maintains an aesthetically pleasing appearance when the sliding unit is in the open position. Finally, since the seal is not disposed on the sliding unit, an operator, such as the driver or passenger of the vehicle, avoids risk of contacting the seal when operating the sliding unit. Thus, the potential for damaging the seal is greatly reduced.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
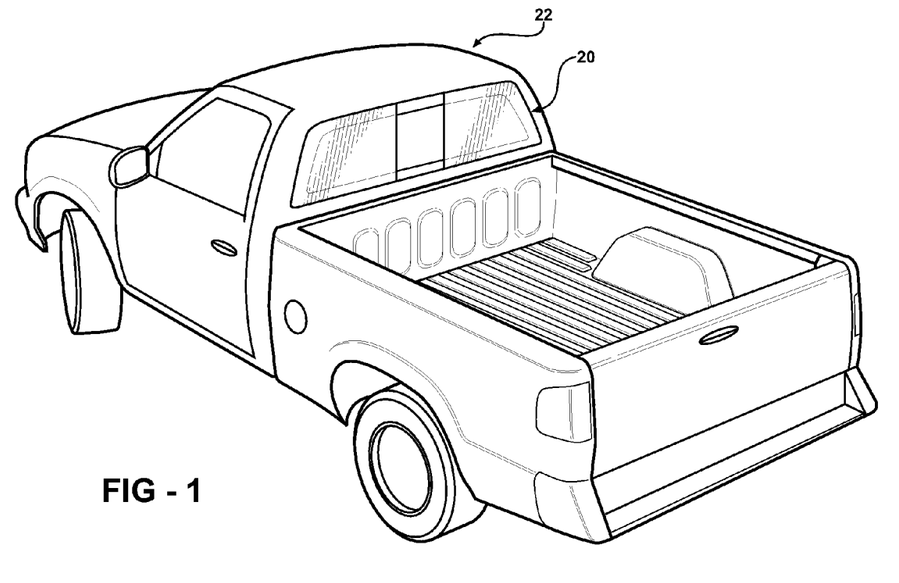
FIG. 1 is an outside perspective view of a vehicle with a sliding window assembly implemented as a backlite of the vehicle.

Referring to the Figures, wherein like numerals indicate like parts throughout the several views, a sliding window assembly is generally shown at 20. Referring to FIG. 1, a preferred embodiment of the sliding window assembly 20 is shown in a vehicle 22, specifically as a backlite in a pickup truck. However, it is to be appreciated that the sliding window assembly 20 of the present invention can be implemented in other types of vehicles, as well as in non-vehicle applications.

Figure 2:
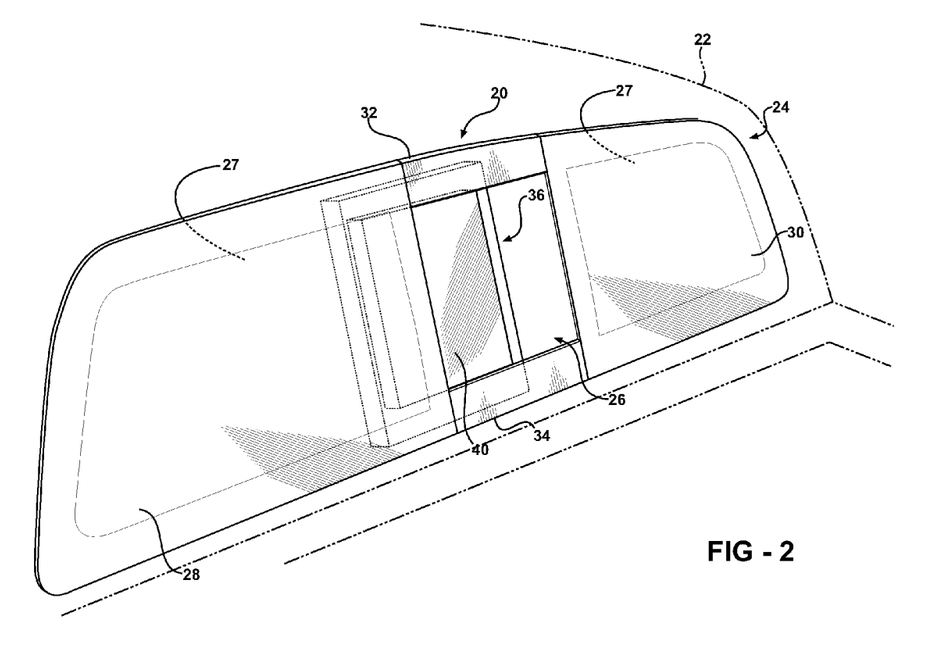
FIG. 2 is an outside perspective view of a preferred embodiment of the sliding window assembly with a sliding unit horizontally movable between open and the closed positions.

Referring to FIG. 2, the assembly 20 includes a structural body 24 defining an opening 26. The structural body includes an interior side 27 facing the interior of the vehicle 22 when said assembly 20 is installed in the vehicle 22. In the preferred embodiment, the structural body 24 is implemented as a first fixed panel 28, a second fixed panel 30, an upper fixed panel 32, and a lower fixed panel 34. The first and second fixed panels 28, 30 are spaced apart from each other. The upper and lower fixed panels 32, 34 are also spaced apart from each other and disposed between said first and second fixed panels 28, 30 Those skilled in the art realize that the upper and lower fixed panels 32, 34 are commonly referred to as appliqués. The opening 26 is defined between the fixed panels 28, 30, 32, 34. Of course, those skilled in the art realize configurations for the structural body 24 other than the configuration of fixed panels 28, 30, 32, 34 described above. For example, the structural body 24 could be implemented as a single panel or utilizing other structural components known to those skilled in the art.

The first and second fixed panels 28, 30 of the preferred embodiment are preferably formed of glass, but could alternatively be formed of plastic, metal, and the like. The upper and lower fixed panels 32, 34 are preferably formed of a polycarbonate plastic, but could alternatively be formed of other plastics, glass, metal, and the like. Those skilled in the art realize a wide variety of appropriate materials that may be utilized to form the fixed panels 28, 30, 32, 34.

Figure 3:
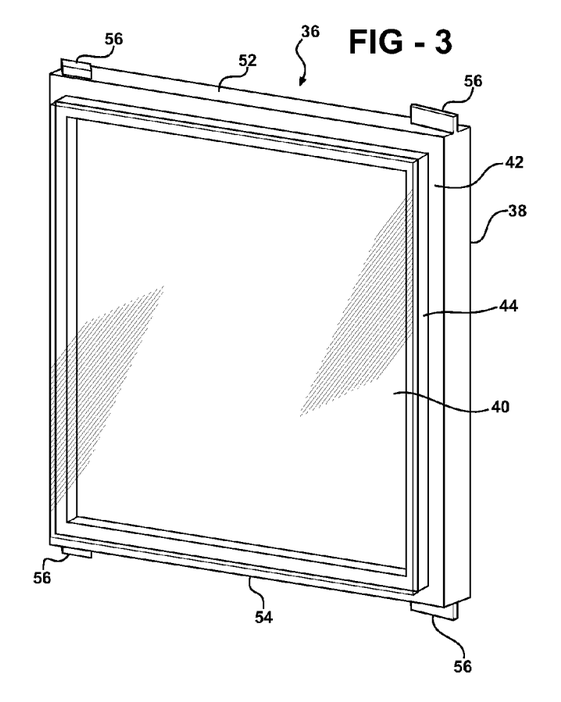
FIG. 3 is a perspective view of the sliding unit of the preferred embodiment of the sliding window assembly.

The assembly 20 also includes a sliding unit 36 that is slidable between a closed position and an open position. The sliding unit 36 moves between the open and closed positions to modify a size of the opening 26. Specifically, when in the closed position, the sliding unit 36 closes the opening 26. In the preferred embodiment, and as shown in FIG. 3, the sliding unit 36 includes a carrier component 38 and a sliding panel 40 connected to the carrier component 38. Specifically, the carrier component 38 has an outer face 42 and a flange portion 44 extending from the outer face 42. The sliding panel 40 is attached to the flange portion 44. The carrier component 38 is preferably formed of a rigid plastic, such as Zytel®, or a similar plastic of a polymer family. The sliding panel 40 is preferably formed of glass. However, the carrier component 38 and the sliding panel 40 may alternatively be formed of plastic, metal, or any other suitable material. The connection between the carrier component 38 and the sliding panel 40 may be accomplished by encapsulating the carrier component 38 around edges the sliding panel 40. Alternatively, the sliding panel 40 may be adhered to the carrier component 38. Furthermore, the sliding unit 36 may be formed as a unitary part, without the need for the separate sliding panel 40 and carrier component 38 to be connected together.

Figure 4:
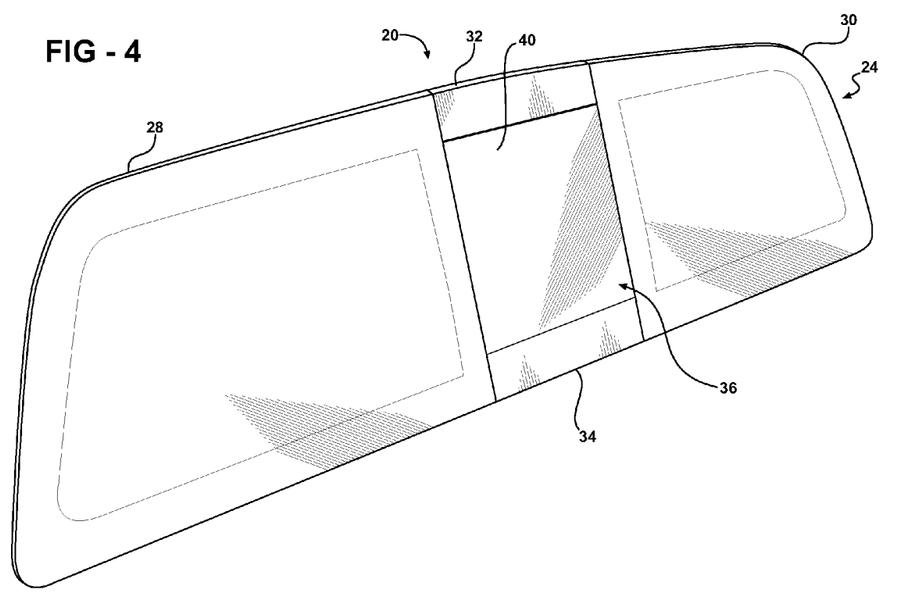
FIG. 4 is an outside perspective view of the preferred embodiment of the sliding window assembly with the sliding unit in a closed position.

In the preferred embodiment, referring now to FIG. 4, the assembly 20 establishes a substantially flush exterior surface when the sliding unit 36 is closed. More specifically, the sliding panel 40 includes an exterior surface and the fixed panels 28, 30, 32, 34 include exterior surfaces. When the sliding unit 36 is in the closed position, all of these exterior surfaces are substantially flush relative to one another. The substantially flush exterior surface provides an aesthetically pleasing appearance to those outside of the vehicle.

Figure 5:
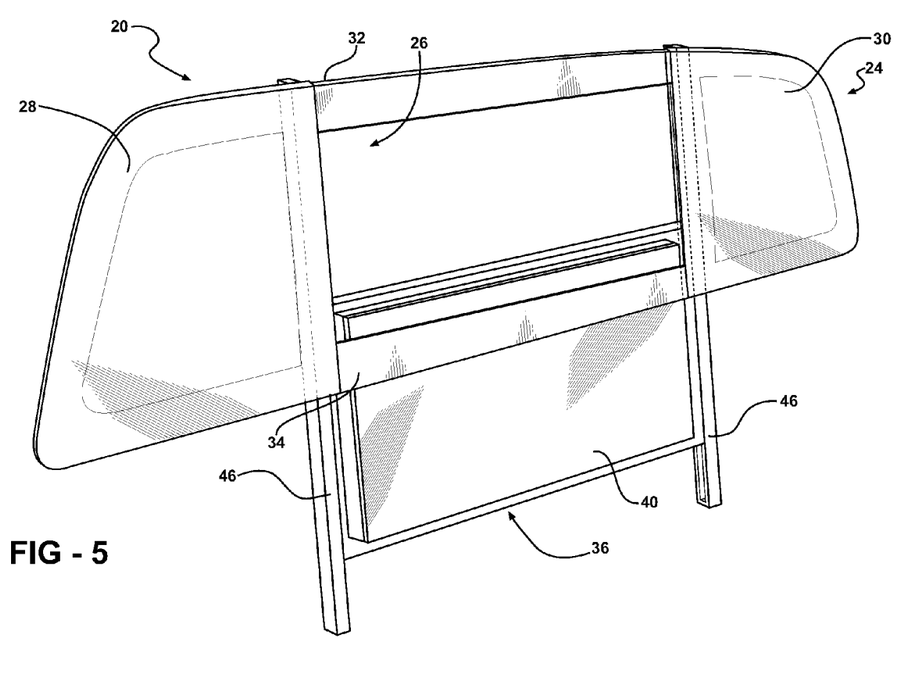
FIG. 5 is an outside perspective view of an alternative embodiment of the sliding window assembly with the sliding unit vertically movable between open and the closed positions.

The sliding unit 36 slides horizontally, as shown in FIG. 2, in the preferred embodiment. While sliding, the sliding unit 36 moves inward relative to the first fixed panel 28, i.e., toward an interior or cab of the vehicle 22. It is appreciated, however, that horizontal movement of the sliding unit 36 is not a necessary component of the scope of the invention. Accordingly, FIG. 5 illustrates an alternative embodiment where the sliding unit 36 is adapted to slide vertically.

Figure 6:
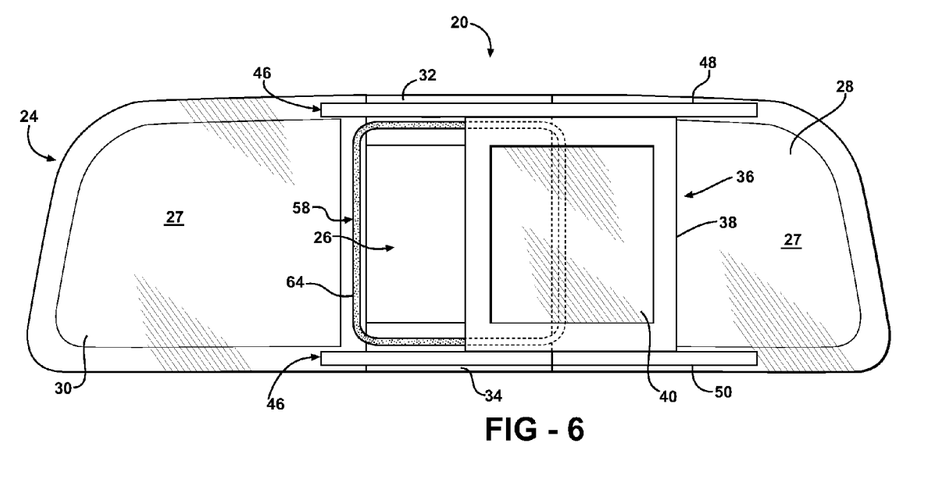
FIG. 6 is an inside perspective view of the preferred embodiment of the sliding window assembly showing a seal encircling an opening.

Referring now to FIG. 6, the structural body 24 of the assembly 20 further includes at least one track member 46. The track member 46 slidably engages the sliding unit 36 for supporting and for enabling movement of the sliding unit 36 between open and closed positions. In the preferred embodiment, the at least one track member 46 is implemented as an upper track member 48 and a lower track member 50. The upper track member 48 is spaced from and substantially parallel to the lower track member 50. However, those skilled in the art appreciate that the assembly 20 can be implemented with only one track member 46 interfacing with the sliding unit 36.

Referring to FIGS. 3 and 6, in the preferred embodiment, the sliding unit 36 includes an upper edge 52 and a lower edge 54. Preferably, the sliding unit 36 also includes at least one tab 56 extending from each edge 52, 54, and more preferably, a pair of tabs 56 extending from each edge 52, 54. The track members 48, 50 each define at least one channel (not labeled) for receiving the tabs 56 and preferably a plurality of channels. The tabs 56 extending from the upper edge 52 interface with the upper track member 48 in its channels. Likewise, the tabs 56 extending from the lower edge 54 interface with the lower track member 50 in its channels. The channels and tabs 56 are shaped and configured to guide the sliding unit 36 into the closed position in which the sliding panel 40 is flush with the fixed panels 28, 30, 32, 34 are into the open position in which the sliding panel 40 is disposed behind the first fixed panel 28.

Of course, those skilled in the art realize alternative embodiments for guiding movement of the sliding unit 36. For instance, in one alternative embodiment (not shown), the track members 46 include rails and the sliding unit 36 defines channels (instead of having tabs 56) such that the sliding unit 36 may slidably engage with the rails.

The first and second fixed panels 28, 30 of the preferred embodiment are coupled to the track members 48, 50. An adhesive is used to adhere the first and second fixed panels 28, 30 to the track members 48, 50. Preferably, the adhesive is an adhesive tape. An example of an acceptable tape is a two sided foam tape manufactured by the 3M Company headquartered in St. Paul, Minn. Alternatively, a urethane adhesive, encapsulation, or other suitable adhesive may be used instead of the adhesive tape. The upper and lower fixed panels 32, 34 are also coupled, respectively, to the upper and lower track members 48, 50.

Those skilled in the art will realize alternative embodiments to form the structural body 24. For example, in one alternative embodiment, the fixed panels 28, 30, 32, 34 and the track member 46 are formed of a unitary material, such that coupling the components together with tape or other adhesives is unnecessary.

Figure 7:
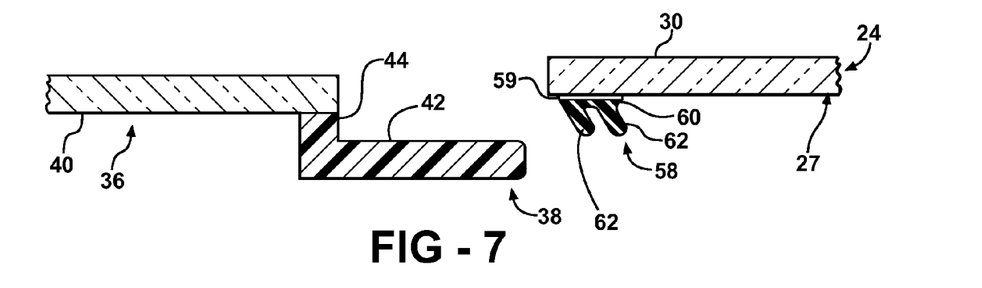
FIG. 7 is a cross-sectional view of the sliding unit in an open position, the seal attached to a fixed panel with an adhesive, and the seal unengaged by the sliding unit.
Figure 8:
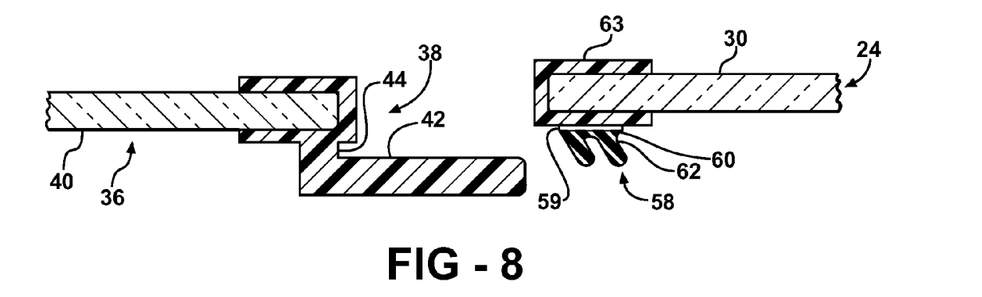
FIG. 8 is a cross-sectional view of the sliding unit in the open position, an encapsulation around an edge of the fixed panel, and the seal attached to the encapsulation.

Referring to FIG. 6, the assembly 20 also includes at least one seal 58 disposed on the interior side 27 of structural body 24 adjacent to the opening 26. Said another way, the at least one seal 58 is disposed on at least one of the fixed panels 28, 30, 32, 34 adjacent the opening 26. The at least on seal 58 is preferably adhered to the structural body 24 with an adhesive layer 59, as shown in FIG. 7. Alternatively, as shown in FIG. 8, an encapsulation 63 may be disposed around at least one edge of at least one of the fixed panels 28, 30, 32, 34. The encapsulation 63 is preferably formed of a polycarbonate material, but other materials may also be acceptable. The seal 58 is then disposed on the encapsulation 63. As shown in FIG. 8, the seal 58 may be connected to the encapsulation 63 with an adhesive layer 59. Alternatively, the seal 58 and the encapsulation 63 may be a single, integrated piece.

Furthermore, the seal 58 and the encapsulation 63 may be provided (i.e., delivered to an automobile assembler) as a single unit. This allows manufacturing advantages as only the single unit need be attached to the fixed panel or fixed panels 28, 30, 32, 34. Those skilled in the art realize other techniques of attaching the at least one seal 58 to the structural body 24.

Figure 9:
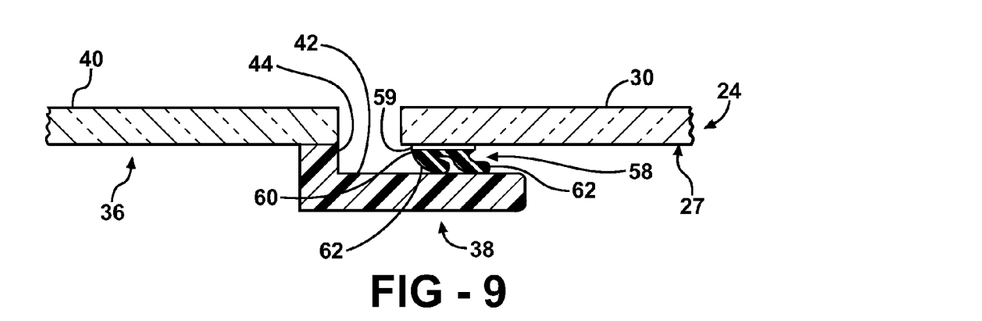
FIG. 9 is a cross-sectional view of the sliding unit in a closed position with the seal engaged by the sliding unit.

The seal 58 is sealingly engagable with the carrier component 38 when the sliding unit 36 is in the closed position. Specifically, in the preferred embodiment, the seal 58 sealingly engages the outer face 42 of the carrier component 38. FIGS. 7 and 8 show the sliding unit 36 and the seal 58 as the sliding unit 38 nears the closed position, yet still in the open position. FIG. 9 shows the sealing relationship between the sliding unit 36 and the seal 58 as the sliding unit 38 is fully closed, i.e., in the closed position. The seal 58 need not be disposed immediately adjacent to the opening 26, but merely disposed near the opening 26 such that the seal 58 is sealingly engagable with the carrier component 38.

The seal 58 is preferably formed of rubber, such that the seal 58 is flexible to perform the sealing function yet durable enough to withstand repeated use. Of course, the seal 58 may be formed of other materials as are known to those skilled in the art. In the preferred embodiment, the seal 58 defines a U-shape. Specifically, the seal includes a base portion 60 and two legs 62 extending from the base portion 60. The base portion 60 is disposed on the structural body 24 and the legs 62 sealingly engage the outer face 42 of the carrier component 38 when the sliding unit 36 is in the closed position. Notably, the legs 62 of the seal 58 do not come into contact with the glass of any of the panels 28, 30, 32, 34, 40.

By having two legs 62, the seal 58 in essence acts as a "double seal", providing two sealing contacts with the outer face 42 of the carrier component 38. The seal 58 with two legs 62 also provides a level of redundancy in case of partial failure of the seal 58. Therefore, if one of the legs 62 should become brittle or damaged, the other leg 62 still provides sealing contact with the outer face 42 of the carrier component 38. Although the U-shaped seal 58 described above provides numerous advantages, those skilled in the art realize the seal 58 may be implemented with in a variety of shapes and configurations, including, but not limited to, a blade seal or a bulb-shaped seal.

Placement of the seal on the structural body 24 (as opposed to on the carrier component 38) also provides several advantages. First, the seal is not directly exposed to the elements, e.g., precipitation, sunlight, road salt, etc. Therefore, the seal will have a greater life span, when compared to prior art window assemblies that expose the seal directly to the elements by compressing the seal between two panes of glass. Second, the seal 58 is never viewable by persons outside of the vehicle 22. Thus the vehicle 22 maintains an aesthetically pleasing appearance when the sliding unit 36 is in the open position. Finally, since the seal 58 is not disposed on the sliding unit 36, an operator, such as the driver or passenger of the vehicle 22, avoids risk of contacting the seal 58 when operating the sliding unit 36. Thus, the potential for damaging the seal 58 is greatly reduced.

Figure 10:
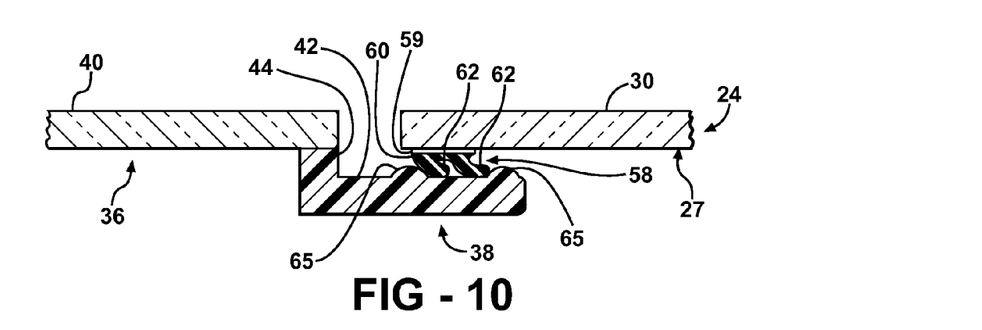
FIG. 10 is a cross-sectional view of the sliding unit in a closed position with the seal engaged by the sliding unit and a pair of protrusions extending from the sliding unit to further engage the seal.

Referring to FIG. 10, the carrier component 38 may include one or more protrusions 65 extending outward from the outer face 42 of the carrier component 38. These protrusions 65 are shaped and positioned to match the profile of the seal 58. When the sliding unit 36 is in the closed position, the protrusions 65 work to further enhance the sealing provided by the seal 58 and the carrier component 38. The protrusions 65 are preferably molded as an integral part of the carrier component 38. Furthermore, the carrier component 38 may be molded such as to define one or more recesses (not shown) in the outer face 42, to even further enhance sealing.

In the preferred embodiment, as shown in FIG. 6, the at least one seal 58 is a single seal 64 which encircles the opening 26. The single seal 64 is formed in a one-piece, continuous construction and is disposed on the structural body 24 adjacent to the opening 26. Specifically, the single seal 64 is disposed on the first fixed panel 28, the second fixed panel 30, the upper panel 32, and the lower panel 34 adjacent to the opening 26.

Figure 11:
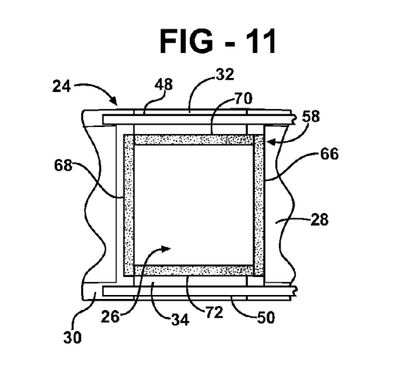
FIG. 11 is a partial perspective view of four seals encircling the opening.
Figure 12:
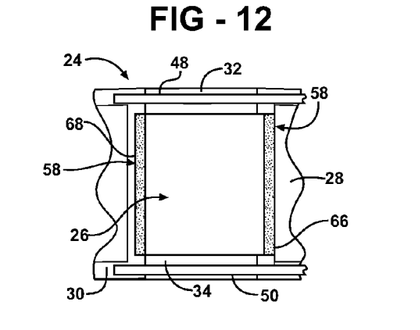
FIG. 12 is a partial perspective view of a pair of seals adjacent the opening.

In alternate embodiments, a plurality of seals 58 may be used to seal the structural body 24 with the sliding unit 36. Referring to FIG. 11, a first seal 66 is disposed on the first fixed panel 28 adjacent the opening 26, a second seal 68 is disposed on the second fixed panel 30 adjacent the opening 26, an upper seal 70 is disposed on the upper fixed panel 32 adjacent the opening 26, and a lower seal 72 is disposed on the lower fixed panel 34 adjacent the opening 26. These four seals 66, 68, 70, 72 encircle the opening 26 such that the sealing functionality is similar to that of the single seal 64. FIG. 12 illustrates an embodiment utilizing two seals 58: the first seal 66 disposed on the first fixed panel 28 and the second seal 68 disposed on the second fixed panel 30. Of course, numerous other configurations for the seal 58 or seals 58 may be contemplated by those skilled in the art.

In the embodiments where the single seal 64 or plurality of seals 58 encircles the opening, an exceptional seal is achieved. When the assembly 20 is implemented in the vehicle, 22 an excellent barrier between the interior of the vehicle 22 and the exterior of the vehicle 22 is formed. Consequently, precipitation, noise, and other outside elements are prohibited from entering the interior of the vehicle 22 via the sliding window assembly 20.

The assembly 20 is preferably installed into the vehicle 22 by adhering the interior side 27 of the fixed panels 28, 30, 32, 34 directly to a window frame (not shown) of the vehicle 22. Of course, those skilled in the art recognize other suitable methods for installing the assembly 20 in the vehicle.

Obviously, many modifications and variations of the present invention are possible in light of the above teachings. The invention may be practiced otherwise than as specifically described within the scope of the appended claims.

What is claimed is:

1. A sliding window assembly for a vehicle, said sliding window assembly comprising:
   a structural body defining an opening and including at least one track member;
   a sliding unit slidably engageable with said track member and slidable between an open position and a closed position wherein said sliding unit closes said opening when said sliding unit is in said closed position;
   said sliding unit including a carrier component having an outer face, a flange portion extending from said outer face, and a sliding panel attached to said flange portion of said carrier component;
   at least one pair of protrusions extending outward from said outer face; and
   at least one seal disposed on said structural body adjacent to and encircling said opening and disposed between said protrusions when said sliding unit is in said closed position to sealingly engage with said outer face of said carrier component and said protrusions when said sliding unit is in said closed position.

2. A sliding window assembly as set forth in claim 1 wherein said structural body includes an interior side facing an interior of the vehicle when said assembly is installed in the vehicle and wherein said at least one seal is disposed on said interior side of said structural body.

3. A sliding window assembly as set forth in claim 1 wherein said at least one seal is adhered to said structural body with an adhesive.

4. A sliding window assembly as set forth in claim 1 wherein said structural body includes at least one fixed panel.

5. A sliding window assembly as set forth in claim 4 wherein said at least one seal is disposed on said at least one fixed panel adjacent said opening and is sealingly engagable with said outer face of said carrier component when said sliding unit is in said closed position.

6. A sliding window assembly as set forth in claim 5 wherein said at least one seal is further defined as an single seal disposed on said at least one fixed panel.

7. A sliding window assembly as set forth in claim 4 wherein said at least one fixed panel is further defined as a first fixed panel and a second fixed panel spaced apart from each other with said opening defined therebetween.

8. A sliding window assembly as set forth in claim 4 wherein said at least one fixed panel is further defined as a first fixed panel and a second fixed panel spaced apart from each other, an upper fixed panel and a lower fixed panel spaced apart from each other and disposed between said first and second fixed panels, wherein said opening is defined between said fixed panels.

9. A sliding window assembly as set forth in claim 8 wherein said at least one seal is further defined as a first seal disposed on said first fixed panel adjacent said opening, a second seal disposed on said second fixed panel adjacent said opening, an upper seal disposed on said upper fixed panel adjacent said opening, and a lower seal disposed on said lower fixed panel adjacent said opening.

10. A sliding window assembly as set forth in claim 8 wherein said at least one seal is further defined as a single seal disposed on said first fixed panel, said second fixed panel, said upper panel, and said lower panel.

11. A sliding window assembly as set forth in claim 4 wherein said sliding panel includes an exterior surface and said at least one fixed panel includes an exterior surface and all of said exterior surfaces are substantially flush relative to one another when said sliding unit is in said closed position.

12. A sliding window assembly as set forth in claim 1 wherein said seal is further defined as a U-shaped seal having a base portion disposed on said structural body and two legs extending from said base portion to sealingly engage said outer face of said carrier component when said sliding unit is in said closed position.

13. A sliding window assembly as set forth in claim 1 wherein said seal is formed of rubber.

14. A sliding window assembly as set forth in claim 1 wherein said sliding panel is formed of glass.

15. A sliding window assembly for a vehicle comprising:
a first fixed panel and a second fixed panel spaced apart from each other;
an upper fixed panel and a lower fixed panel spaced apart from each other and disposed between said first and second fixed panels;
an opening defined between said fixed panels;
at least one track member coupled to at least one of said fixed panels;
a sliding unit slidably engagable with said at least one track member and slidable between an open position and a closed position wherein said sliding unit blocks said opening when said sliding unit is in said closed position;
said sliding unit including a carrier component with an outer face, a flange portion extending from said outer face, and a sliding panel attached to said flange portion of said carrier component;
at least one pair of protrusions extending outward from said outer face; and
at least one seal disposed on at least one of said first and second fixed panels adjacent to said opening and disposed between said protrusions when said sliding unit is in said closed position to sealingly engage with said outer face of said carrier component and said protrusions when said sliding unit is in the closed position.

16. A sliding window assembly as set forth in claim 15 wherein said fixed panels each include an interior side facing an interior of the vehicle when said assembly is installed in the vehicle and wherein said at least one seal is disposed on said interior side of said at least one of said first and second fixed panels.

17. A sliding window assembly as set forth in claim 15 wherein said at least one seal is adhered to said structural body with an adhesive.

18. A sliding window assembly as set forth in claim 15 wherein said sliding panel includes an exterior surface and said fixed panels include exterior surfaces and all of said exterior surfaces are substantially flush relative to one another when said sliding unit is in said closed position.

19. A sliding window assembly as set forth in claim 15 wherein said at least one seal is further defined as a first seal disposed on said first fixed panel adjacent said opening, a second seal disposed on said second fixed panel adjacent said opening, an upper seal disposed on said upper fixed panel adjacent said opening, and a lower seal disposed on said lower fixed panel adjacent said opening.

* * * * *